W. WERTS.
Machine for Shrinking Tires.

No. 99,268. Patented Jan'y 25, 1870.

WITNESSES
G. R. Chapin,
E. E. Gibson

INVENTOR
William Werts

United States Patent Office.

WILLIAM WERTS, OF CHICAGO, ILLINOIS.

Letters Patent No. 99,268, dated January 25, 1870.

IMPROVED MACHINE FOR SHRINKING TIRE.

The Schedule referred to in these Letters Patent and making part of the same.

*To all whom it may concern:*

Be it known that I, WILLIAM WERTS, of Chicago, in the county of Cook, and State of Illinois, have invented an Improved Tire-Shrinker; and I do hereby declare that the following is a full and exact description thereof, which will enable those skilled in the art to make and use the same, reference being had to the accompanying drawings, and letters marked thereon, making a part of this specification, in which—

Figure 1:
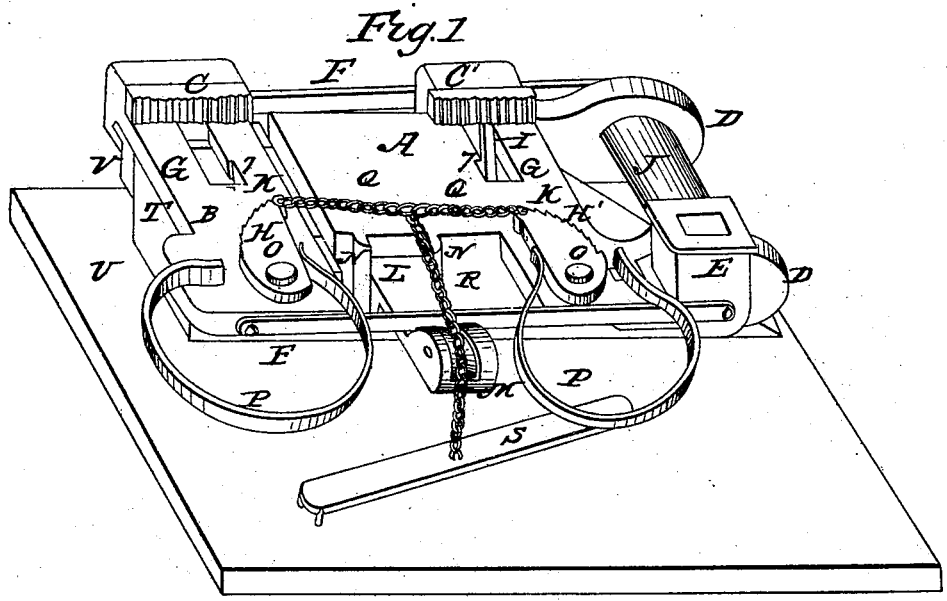

Figure 1 is a perspective representation of my improved tire-shrinker.

Figure 2:
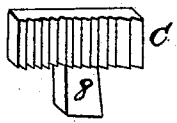

Figure 2, a perspective view of one of the ratchet-cams, which hold the tire while it is being shrunk or upset.

The present invention relates to an improvement in that class of tire-shrinkers which is used to upset tires without cutting them; and Its nature consists in the novel manner of holding the corrugated dogs in place, and the novel construction of the springs, chain-pulley, and treadle, for grasping and loosening the tire during the time of shrinking and removing the tire; also in the manner in which the clamping-blocks are connected, as the whole is hereinafter fully shown.

U T represent an elevated platform, or table, which supports, on both its longitudinal sides, tongued guides, V, on which a movable clamp, B, is arranged to have a reciprocating movement.

This clamp has pivoted to it, two coupling-rods, F, which are pivoted to wrist-pivots $x$, fastened to both ends of a shaft, J, having bearings in lugs, D, cast solid to an iron frame, A, fastened to the part T of the bed or table U T. One end of the shaft J is provided with a socket, E, in which a lever is to be put, to draw the clamp B forward far enough to upset a tire.

The devices for holding a tire in a fixed position, consist of dogs C' C, and pivoted cams H H', the dog C being fixed to the movable clamp B, and the dog C' fixed to the iron frame A, as shown at fig. 1.

The dogs C C' are provided with shanks 8, fig. 2, which fit into recesses countersunk in the clamp B and frame A, and they are held in place by short braces of wood, I, which are placed diagonally in the recesses G, the shanks 8 of the dogs C C' being so dovetailed into the recesses G G as to stay in place when the braces I are in position.

The cam H is pivoted to the clamp B, opposite to the dog C, and the cam H' is pivoted to the bed A, opposite to the dog C', and to their inner ends, at K K, is attached a chain, Q Q, which is connected with a foot-lever, S, by means of a chain, R, passing over a friction-pulley, M, pivoted to an arm, L, projecting out at one side of the bed A, and having such a form as will keep the chain R from coming in contact with the bar F on that side of the machine.

This construction is such that when the lever S is brought down with the foot, the cams H H' are turned outward on their pivots O O far enough for a tire to be placed between the cams and dogs, springs P P being fastened to the bed A and clamp B, bearing against the cams H H', force them against the edge of the tire, and hold it in place when it is being upset.

Having thus described my invention,

What I claim, and desire to secure by Letters Patent of the United States, is—

The combination of the treadle S, arm L, roller M, chains Q R, springs P P, cam H H', dogs C C', braces I, clamp B, and bed A, as set forth,

WILLIAM WERTS.

Witnesses:
G. L. CHAPIN,
E. E. GIBSON.